United States Patent
Yoo et al.

(10) Patent No.: US 8,934,885 B2
(45) Date of Patent: Jan. 13, 2015

(54) SMALL CELL BASE STATION MANAGING SYSTEM AND METHOD OF MANAGING SMALL CELL BASE STATION

(71) Applicant: Electronics and Telecommunications Research Institute, Daejeon (KR)

(72) Inventors: Hwan Souk Yoo, Daejeon (KR); Byung-Han Ryu, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 99 days.

(21) Appl. No.: 13/683,496

(22) Filed: Nov. 21, 2012

(65) Prior Publication Data

US 2013/0157643 A1 Jun. 20, 2013

(30) Foreign Application Priority Data

Dec. 15, 2011 (KR) .......................... 10-2011-0135207

(51) Int. Cl.
*H04W 24/02* (2009.01)
(52) U.S. Cl.
CPC ..................................... *H04W 24/02* (2013.01)
USPC .......... 455/418; 455/435.1; 455/450; 455/515

(58) Field of Classification Search
USPC ................ 455/414.1–414.3, 418–420, 422.1, 455/432.1–444, 500, 553.1
See application file for complete search history.

(56) References Cited

U.S. PATENT DOCUMENTS

| | | | |
|---|---|---|---|
| 2006/0052124 A1* | 3/2006 | Pottenger et al. | 455/515 |
| 2009/0131050 A1* | 5/2009 | Osborn | 455/435.1 |
| 2010/0234017 A1 | 9/2010 | Lim et al. | |
| 2013/0065600 A1* | 3/2013 | Lim | 455/450 |

FOREIGN PATENT DOCUMENTS

KR 1020100101902 9/2010

* cited by examiner

*Primary Examiner* — Kashif Siddiqui
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed is a small cell base station managing method of a small cell base station managing system which manages a plurality of small cell base stations. The small cell base station managing method includes receiving a reconfiguration request; selecting a radio access technology (hereinafter, referred to as RAT) of a selected small cell base station according the reconfiguration request; and requesting the selected small cell base station to operate using the selected RAT.

11 Claims, 7 Drawing Sheets

SMALL CELL BASE STATION MANAGING SYSTEM AND METHOD OF MANAGING SMALL CELL BASE STATION

CROSS-REFERENCE TO RELATED APPLICATIONS

A claim for priority under 35 U.S.C. §119 is made to Korean Patent Application No. 10-2011-0135207 filed Dec. 15, 2011, in the Korean Intellectual Property Office, the entire contents of which are hereby incorporated by reference.

BACKGROUND

The inventive concepts described herein relate to wireless communication, and more particularly, relate to a small cell base station managing system and a method of managing a small cell base station.

A wireless mobile network may provide a seamless wireless communication service to a wireless communication terminal having mobility. The wireless mobile network may be formed of a plurality of base stations.

Each base station may operate one cell. A base station may perform wireless communication with a wireless communication terminal placed within a corresponding cell. When a wireless communication terminal moves from one cell (e.g., a source cell) into another cell (e.g., a target cell), a base station of the target cell may establish communication with a wireless communication terminal, and a base station of the source cell may terminate communication with the wireless communication terminal. This operation may be referred to as a handover (HO). The handover may enable the wireless mobile network to provide a seamless wireless communication service to a wireless communication terminal.

Commercialized wireless mobile networks may include GSM (Global System for Mobile communication), CDMA (Code Division Multiple Access), WCDMA (Wideband CDMA), CDMA 2000, WiMAX (World interoperability for Microwave Access), LTE (Long Term Evolution), and the like.

SUMMARY

Example embodiments of the inventive concept provide a small cell base station managing method of a small cell base station managing system which manages a plurality of small cell base stations. The small cell base station managing method comprises receiving a reconfiguration request; selecting a radio access technology (hereinafter, referred to as RAT) of a selected small cell base station according the reconfiguration request; and requesting the selected small cell base station to operate using the selected RAT.

In example embodiments, the selected small cell base station is a software defined radio (SDR) small cell base station.

In example embodiments, the small cell base station managing method further comprises judging whether a user terminal sending the reconfiguration request is an authorized user terminal.

In example embodiments, the small cell base station managing method further comprises sending a selection confirm message according to the reconfiguration request to a user terminal sending the reconfiguration request.

In example embodiments, the small cell base station managing method further comprises sending information about small cell base stations, having a reconfiguration function, from among the plurality of small cell base stations to a user terminal sending the reconfiguration request.

In example embodiments, the selected small cell base station is selected from the small cell base stations having the reconfiguration function.

In example embodiments, the information about the small cell base stations comprises information of small cell base stations based on location information of a global positioning system, history information about small cell base stations performing reconfiguration, information about predetermined small cell base stations, or information of small cell base stations based on subscription information of a user terminal sending the reconfiguration request.

In example embodiments, the small cell base station managing method further comprises judging RAT of the selected base station, based on a bootstrap message input from the selected small cell base station, wherein when RAT of the selected base station is different from the selected RAT, the requesting the selected small cell base station to operate using the selected RAT is performed.

In example embodiments, the small cell base station managing method further comprises sending a state report request to the selected small cell base station according to the reconfiguration request; and judging RAT of the selected base station based on a state report transferred from the selected small cell base station, wherein when RAT of the selected base station is different from the selected RAT, the requesting the selected small cell base station to operate using the selected RAT is performed.

In example embodiments, the small cell base station managing method further comprises reserving a schedule according to the reconfiguration request, wherein the requesting the selected small cell base station to operate using the selected RAT is performed according to the reserved schedule.

Example embodiments of the inventive concept provide a small cell base station managing system comprising a communication unit communicating with an external device; a small cell base station control database storing information about radio access technology (hereinafter, referred to as RAT) of small cell base stations; and a processing unit controlling the communication unit and the small cell base station control database, wherein when a reconfiguration request is received from the communication unit, the processing unit updates the small cell base station control database according to the reconfiguration request.

In example embodiments, the processing unit updates information about RAT of a small cell base station selected from the small cell base station control database according to the reconfiguration request.

In example embodiments, the processing unit controls the communication unit to send an RAT reconfiguration request to a selected small cell base station according to the reconfiguration request.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
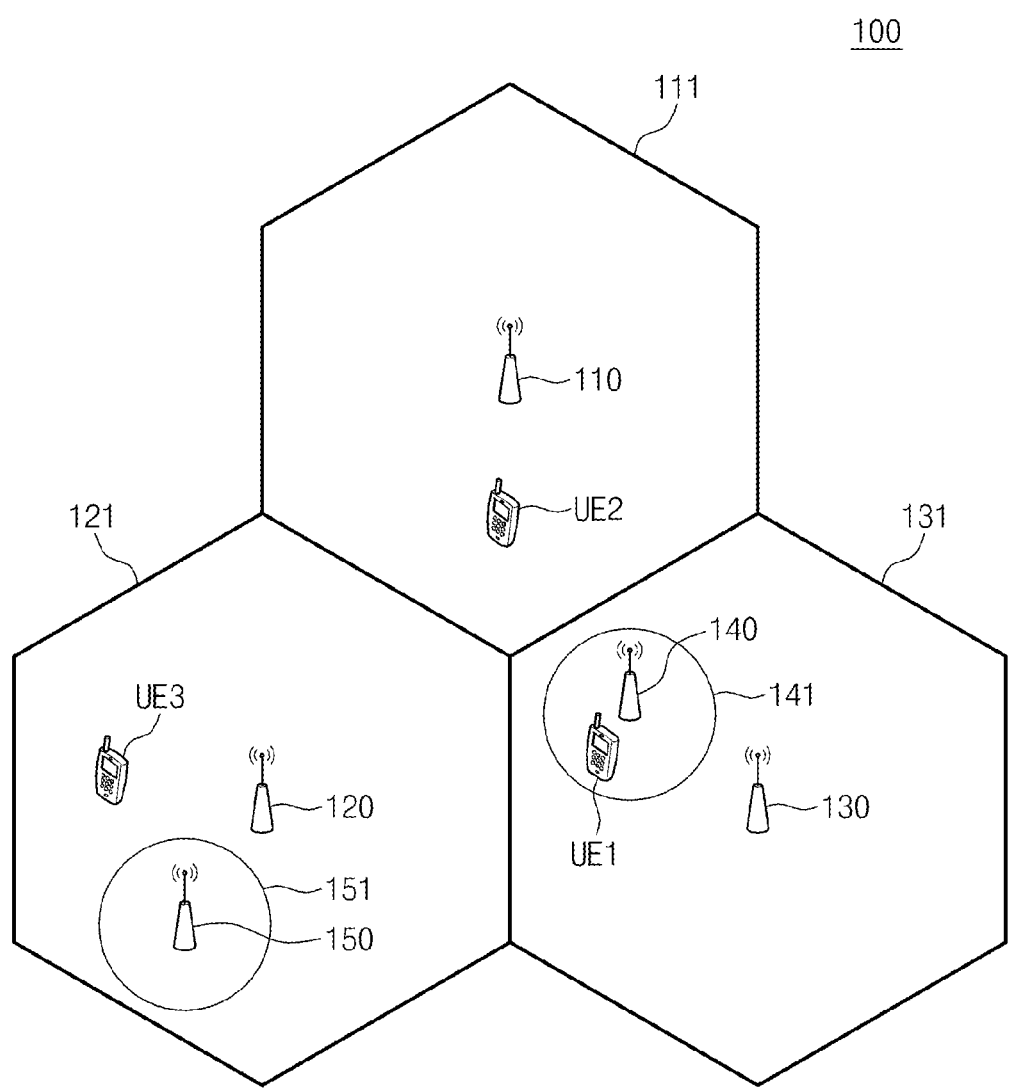
FIG. 1 is a conceptual diagram schematically illustrating a cellular network according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a conceptual diagram schematically illustrating a cellular network according to an embodiment of the inventive concept. Referring to FIG. 1, a cellular network 100 may include macro base stations 110, 120, and 130 and small cell base stations 140 and 150. The macro base stations 110, 120, and 130 and small cell base stations 140 and 150 may perform wireless transmission and reception with user equipment UE1, UE2, and UE3.

The macro base stations 110, 120, and 130 may form macro cells 111, 121, and 131, respectively. The small cell base stations 140 and 150 may form small cells 141 and 151, respectively. A size of each of the macro cells 111, 121, and 131 may be larger than that of each of the small cells 141 and 151.

The macro cells 111, 121, and 131 may form a basic cell structure of the cellular network 100. The small cells 141 and 151 may cover a shadow region or a region that the density of the user equipment is high, within the basic cell structure formed by the macro cells 111, 121, and 131. The macro base stations 110, 120, and 130 forming the macro cells 111, 121, and 131 may be referred to as HeNB (Home evolved Node B).

The cellular network 100 may include a plurality of cells that have different sizes. That is, the cellular network 100 may be a heterogeneous network.

The small cell base stations 140 and 150 may be Software Defined Radio (SDR) small cell base stations. The SDR small cell base stations 140 and 150 may switch RAT (Radio Access Technology) through software processing. For example, the SDR small cell base stations 140 and 150 may select or change one of RATs such as LTE (Long Term Evolution), W-CDMA, HSDPA (High Speed Downlink Packet Access), HSPA (High Speed Packet Access), and the like, and may communicate using the selected or switched RAT.

Figure 2:
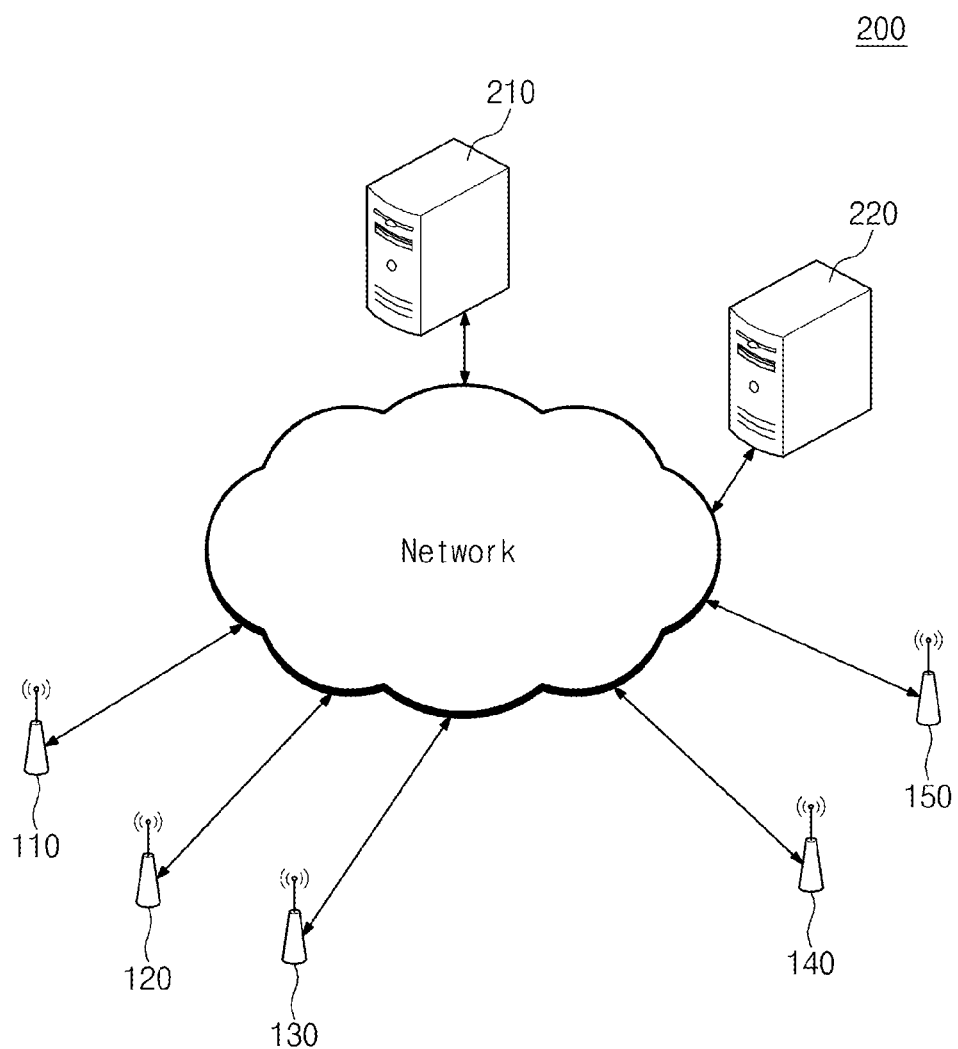
FIG. 2 is a conceptual diagram schematically illustrating a wireless communication network including a cellular network in FIG. 1.

FIG. 2 is a conceptual diagram schematically illustrating a wireless communication network including a cellular network in FIG. 1. Referring to FIGS. 1 and 2, a wireless communication network 200 may include a mobility management entity (MME) 210, a small cell base station managing system 220, macro base stations 110, 120, and 130, and small cell base stations 140 and 150. For ease of illustration, cells 111, 121, 131, 141, and 151 in FIG. 1 are not illustrated in FIG. 2.

The mobility management entity 210 may be configured to control the wireless communication network 200 and wireless communication between the wireless communication network 200 and user equipment UE1, UE2, and UE3.

The small cell base station managing system 220 may manage the small cell base stations 140 and 150. The small cell base station managing system 220 may store RAT information of the small cell base stations 140 and 150, and may control a change of RAT of the small cell base stations 140 and 150.

The small cell base station managing system 220 may receive an RAT reconfiguration request of the small cell base stations 140 and 150 from a user terminal to change RAT of the small cell base stations 140 and 150. For example, the user terminal requesting an RAT change of the small cell base stations 140 and 150 may include a personal computer, a web connection device, a smart phone, a telephone, a handheld phone, and the like.

A user operating the small cell base station managing system 220 may send the RAT reconfiguration request of the small cell base stations 140 and 150 through an application program of a personal computer, a web program of a web connection device, a short message service of a smart phone or a handheld phone, an automatic response system of a smart phone, a handheld phone or a telephone, voice recognition of a smart phone, a handheld phone or a telephone, or a control panel attached to the small cell base station managing system 220. That is, the user may easily reconfigure RAT of the small cell base stations 140 and 150 using own user terminal without a service provider or a network provider.

Figure 3:
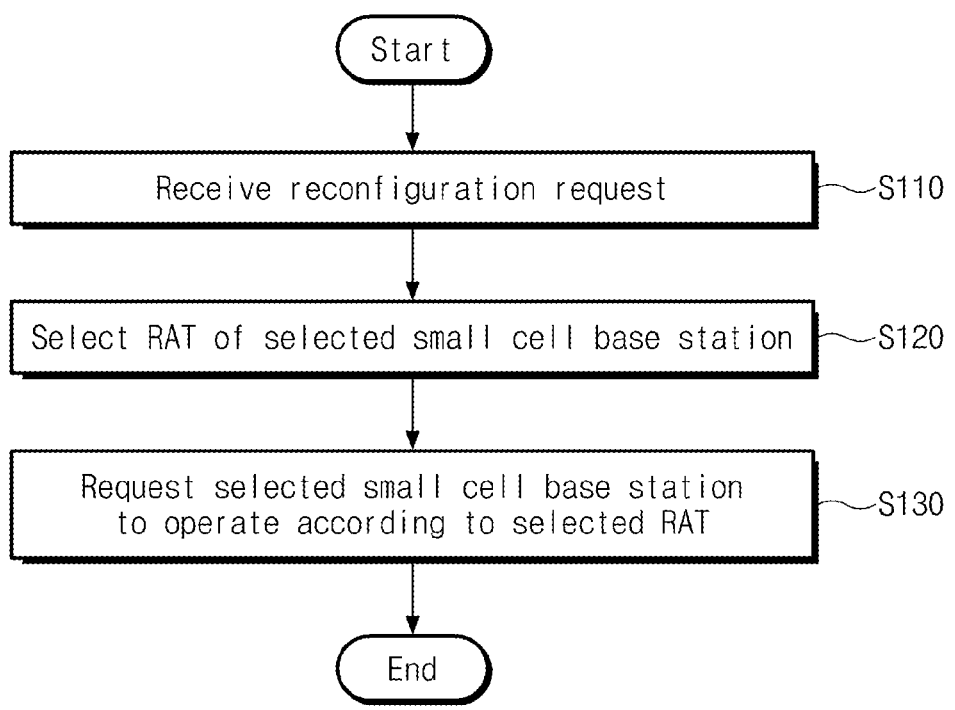
FIG. 3 is a flowchart illustrating a small cell base station managing method of a small cell base station managing system according to an embodiment of the inventive concept.

FIG. 3 is a flowchart illustrating a small cell base station managing method of a small cell base station managing system according to an embodiment of the inventive concept. Referring to FIGS. 2 and 3, in operation S110, a small cell base station managing system 220 may receive a reconfiguration request. For example, the small cell base station managing system 220 may directly receive a reconfiguration request from a user terminal through a wire or wireless channel. The small cell base station managing system 220 may receive a reconfiguration request through a device connected with a network. The small cell base station managing system 220 may ay receive a reconfiguration request through macro base stations 110 to 130 or small cell base stations 140 and 150. The reconfiguration request may include information about a small cell base station being a target of RAT reconfiguration and information about RST being a change target.

In operation S120, the small cell base station managing system 220 may select RAT of a selected small cell base station according to the reconfiguration request.

In operation S130, the small cell base station managing system 220 may request the selected small cell base station to operate according to the selected RAT.

Figure 4:
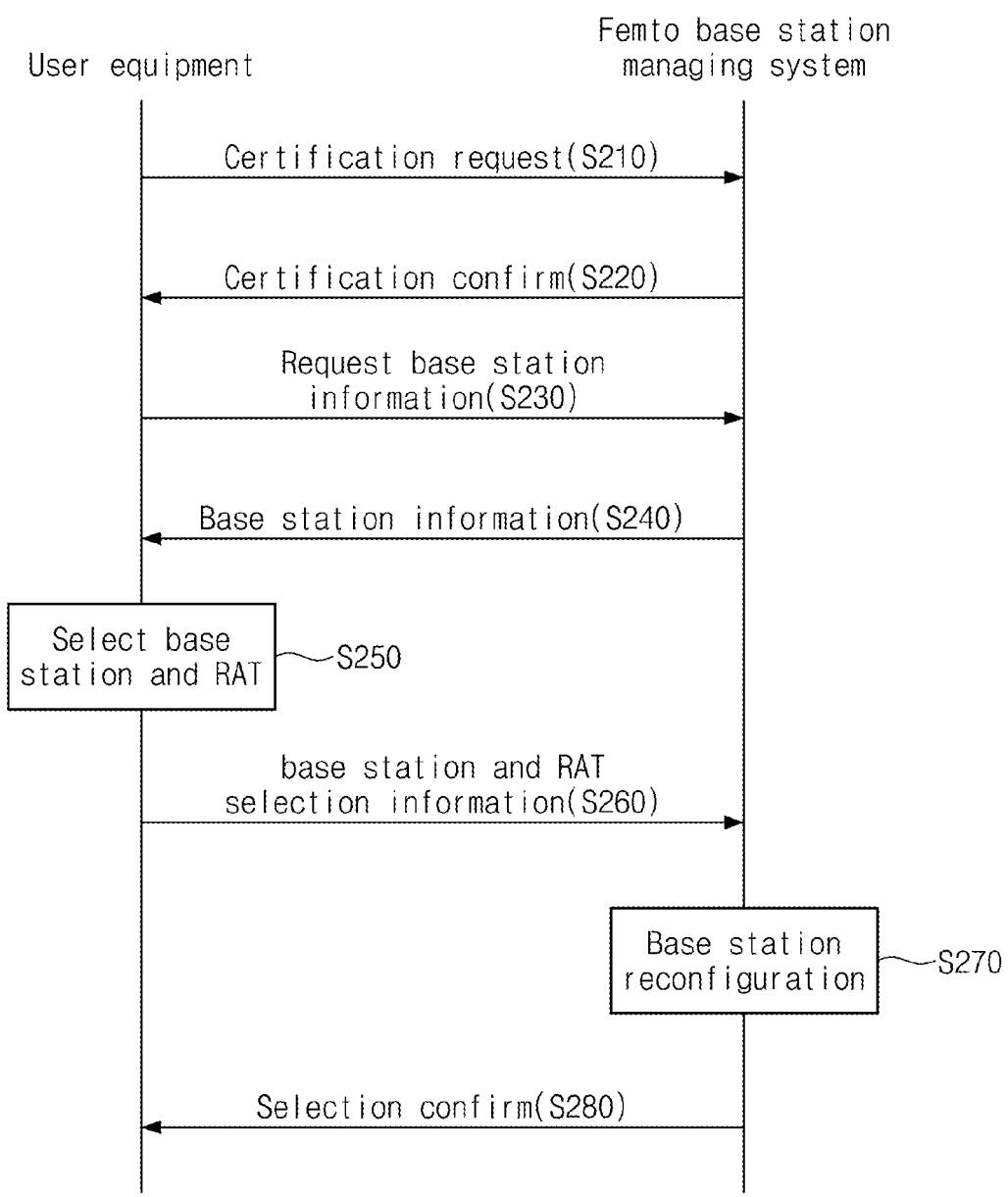
FIG. 4 is a detailed flowchart illustrating a small cell base station managing method of a small cell base station managing system according to an embodiment of the inventive concept.

FIG. 4 is a detailed flowchart illustrating a small cell base station managing method of a small cell base station managing system according to an embodiment of the inventive concept. Referring to FIGS. 2 and 4, in operation S210, a user terminal may send a certification request to a small cell base station managing system 220. In operation S220, the small cell base station managing system 220 may send certification confirmation to the user terminal.

If the user terminal is certified, in operation S230, the user terminal may transfer a base station information request to the small cell base station managing system 220. The user terminal may request information, associated with small cell base stations 140 and 150, capable of changing RAT in software. The user terminal may request a hardware state of the small cell base stations 140 and 150 and CSG (Closed Subscriber Group) subscription information.

In operation S240, the small cell base station managing system 220 may send base station information to the user terminal. The base station information may include an installation location, information about occupied RAT, a list of RAT software stored at the small cell base stations 140 and 150, traffic information, SNMP (Simple Network Management Protocol), and the like. The base station information may include information of the small cell base stations 140 and 150 based on location information of a global positioning system, history information about the small cell base stations 140 and 150 performing reconfiguration, information about predetermined small cell base stations 140 and 150, or information of small cell base stations 140 and 150 based on subscription information of a user terminal sending the reconfiguration request.

In operation S250, the user terminal may select a base station and RAT. The user terminal may select one or plural small cell base stations from a list of the small cell base stations 140 and 150 included in the base station information, that is, a list of SDR small cell base stations 140 and 150. The user terminal may select one of an RAT list that a selected small cell base station can reconfigure. In operation S260, selection information about a small cell base station and RAT may be sent to the small cell base station managing system 220.

In operation S270, the small cell base station managing system 220 may make base station reconfiguration. The small cell base station managing system 220 may control the small cell base stations 140 and 150 such that the selected small cell base station is reconfigured to the selected RAT.

If base station reconfiguration is completed, in operation S280, the small cell base station managing system 220 may send a selection confirm message to the user terminal.

Figure 5:
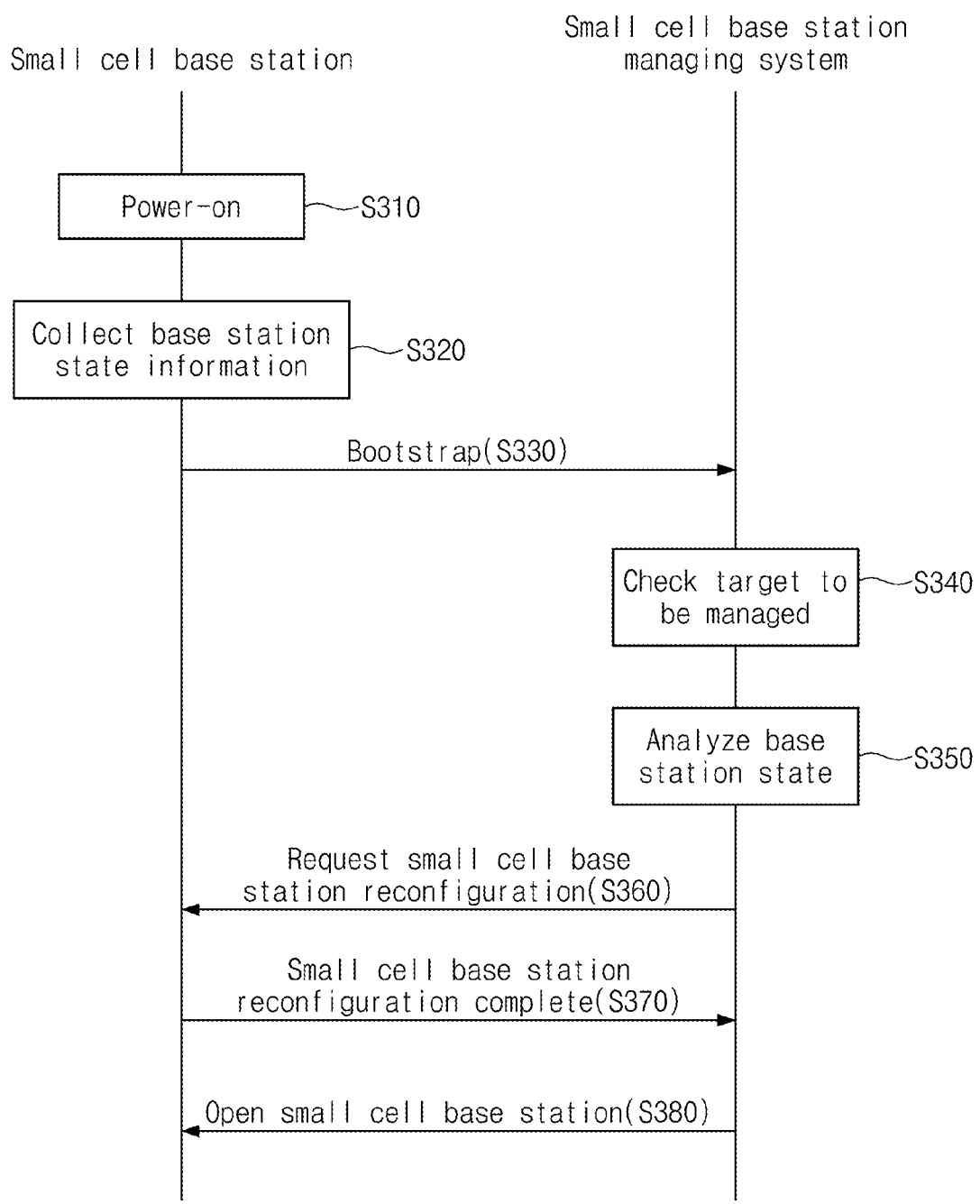
FIG. 5 is a flowchart illustrating a base station reconfiguring method according to an embodiment of the inventive concept.

FIG. 5 is a flowchart illustrating a base station reconfiguring method according to an embodiment of the inventive concept. In FIG. 5, there is exemplarily illustrated a small cell base station reconfiguring method when a small cell base station is switched into a power-on state from a power-off state.

Referring to FIGS. 2 and 5, in operation S310, a small cell base station may be powered on. In operation S320, a small cell base station may collect state information. For example, the small cell base station may collect information about initially set RAT, information about RAT capable of communicating, and the like.

In operation S330, the small cell base station may send a bootstrap message to a small cell base station managing system 220. The bootstrap message may include an initialization request message. The bootstrap message may be sent with information collected at operation S320.

In operation S340, the small cell base station managing system 220 may judge whether a small cell base station sending the bootstrap message is a target to be managed. If so, in operation S340, the small cell base station managing system 220 may analyze a state of a small cell base station. For example, the small cell base station managing system 220 may compare initial RAT of a small cell base station and RAT of a small cell base station requested by the user terminal. If the initial RAT of a small cell base station is equal to the RAT of a small cell base station requested by the user terminal, in operation S380, a small cell base station may become open to communicate.

If the initial RAT of a small cell base station is not equal to the RAT of a small cell base station requested by the user terminal, in operation S360, the small cell base station managing system 220 may send a reconfiguration request to a small cell base station. In response to the reconfiguration request, the small cell base station may be controlled to communicate according to the RAT requested by the user terminal. If reconfiguration is completed, in operation S370, the small cell base station may send a reconfiguration complete message to the small cell base station managing system 220. Afterwards, in operation S380, if the small cell base station managing system 220 sends an open message to the small cell base station, the small cell base station may communicate according to the changed RAT.

Figure 6:
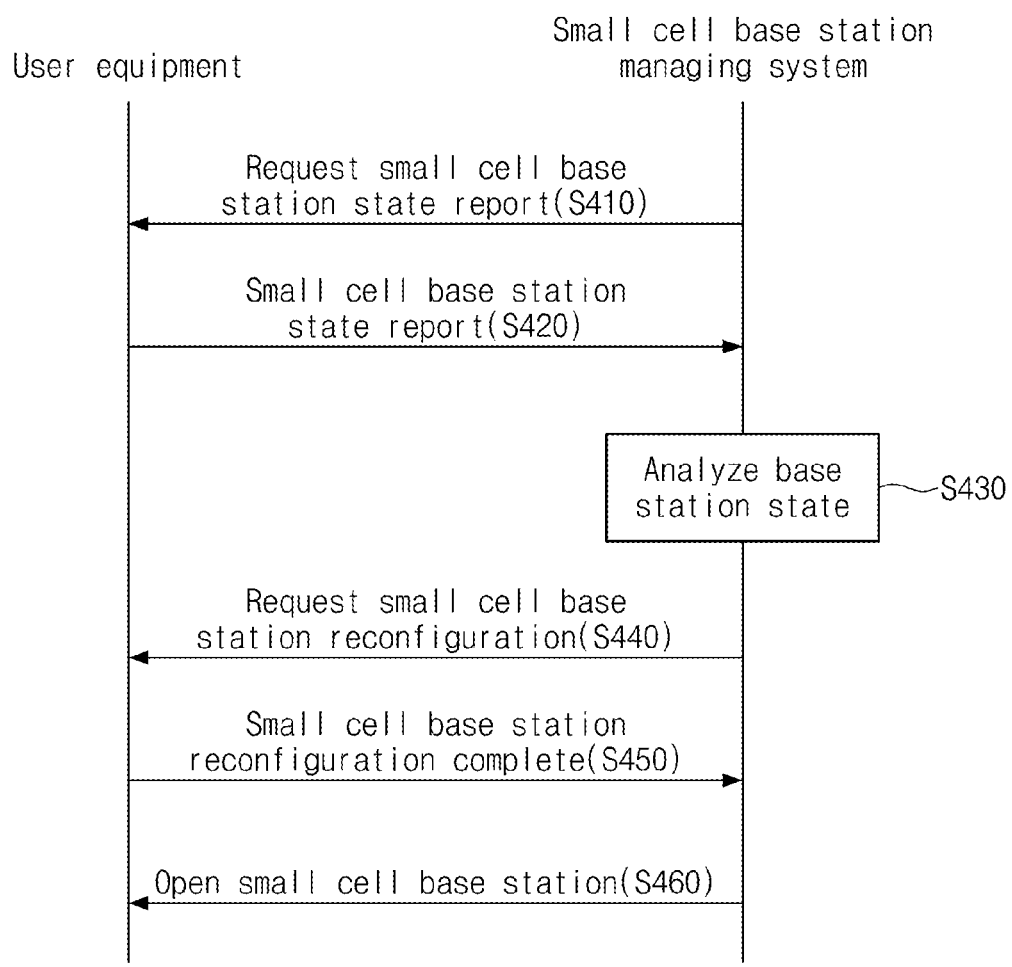
FIG. 6 is a flowchart illustrating a base station reconfiguring method according to another embodiment of the inventive concept.

FIG. 6 is a flowchart illustrating a base station reconfiguring method according to another embodiment of the inventive concept. In FIG. 6, there is exemplarily illustrated a small cell base station reconfiguring method when a reconfiguration request is received from a user terminal.

Referring to FIGS. 2 and 6, in operation S410, a small cell base station managing system 220 may send a state report request to a small cell base station. In response to the state report request, the small cell base station may send a state report to the small cell base station managing system 220. The state report may include information about occupied RAT of a small cell base station. The state report may include information about RAT through which a small cell base station communicates.

In operation S430, the small cell base station managing system 220 may analyze a state of the small cell base station. For example, the small cell base station managing system 220 may compare occupied RAT of the small cell base station and RAT of a small cell base station requested by the user terminal. If the occupied RAT of the small cell base station managing system 220 is equal to the RAT requested by the user terminal, the small cell base station may skip reconfiguration.

If the occupied RAT of the small cell base station managing system 220 is not equal to the RAT requested by the user terminal, in operation S440, the small cell base station managing system 220 may send a reconfiguration request to the small cell base station. In response to the reconfiguration request, the small cell base station may be controlled to communicate according to the RAT requested by the user terminal. If reconfiguration is completed, in operation S450, the small cell base station may send a reconfiguration complete message to the small cell base station managing system 220. Afterwards, if the small cell base station managing system 220 sends an open message to the small cell base station, the small cell base station may communicate according to the changed RAT.

Figure 7:
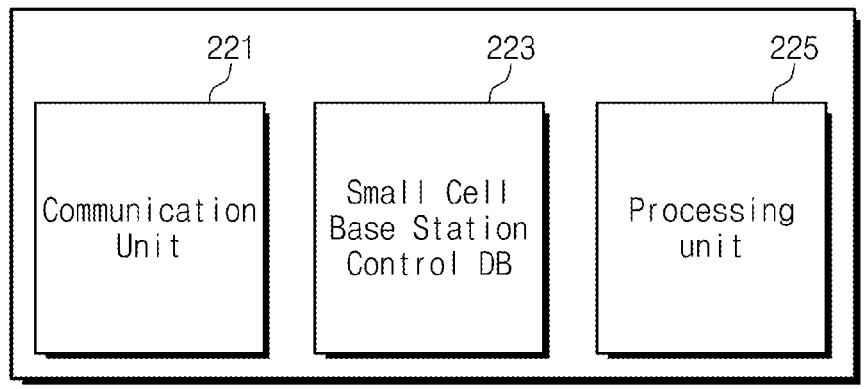
FIG. 7 is a block diagram schematically illustrating a small cell base station managing system according to an embodiment of the inventive concept.

FIG. 7 is a block diagram schematically illustrating a small cell base station managing system according to an embodiment of the inventive concept. Referring to FIG. 7, a small cell base station managing system 220 may include a communication unit 221, a small cell base station control database 223, and a processing unit 225.

The communication unit 221 may communicate with an external device. The communication unit 221 may perform communication with a network or a user terminal.

The small cell base station control database 223 may store information about small cell base stations. The small cell base station control database 223 may store information about SDR small cell base stations of small cell base stations, information about occupied RAT of respective SDR small cell base stations, and information about operating RAT of respective SDR small cell base stations.

The processing unit 225 may be configured to control the communication unit 221 and the small cell base station control database 223. The processing unit 225 may update the small cell base station control database 223 in response to a reconfiguration request input through the communication unit 221. The processing unit 225 may update information about RAT of a small cell base station selected from the small cell base station control database 223 according to the reconfiguration request. The processing unit 225 may control the communication unit 221 to transfer an RAT reconfiguration request to the selected small cell base station according to the reconfiguration request.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A small cell base station managing method of a small cell base station managing system which manages a plurality of small cell base stations, comprising:
    receiving a reconfiguration request;
    selecting a radio access technology (RAT) of a selected one of the plurality of small cell base stations according to the reconfiguration request;
    judging the RAT of the selected small base station, based on a bootstrap message input from the selected small cell base station; and
    requesting the selected small cell base station to operate using the selected RAT,
    wherein the requesting of the selected small cell base station to operate using the selected RAT is performed when the RAT of the selected small base station is different from the selected RAT.

2. The small cell base station managing method of claim 1, wherein the selected small cell base station is a software defined radio (SDR) small cell base station.

3. The small cell base station managing method of claim 1, further comprising:
    judging whether a user terminal sending the reconfiguration request is an authorized user terminal.

4. The small cell base station managing method of claim 1, further comprising:
    sending a selection confirm message according to the reconfiguration request to a user terminal sending the reconfiguration request.

5. The small cell base station managing method of claim 1, further comprising:
    sending information about small cell base stations, having a reconfiguration function, from among the plurality of small cell base stations to a user terminal sending the reconfiguration request.

6. The small cell base station managing method of claim 5, wherein the selected small cell base station is selected from the small cell base stations having the reconfiguration function.

7. The small cell base station managing method of claim 5, wherein the information about the small cell base stations comprises information of small cell base stations based on location information of a global positioning system, history information about small cell base stations performing reconfiguration, information about predetermined small cell base stations, or information of small cell base stations based on subscription information of a user terminal sending the reconfiguration request.

8. A small cell base station managing method of a small cell base station managing system which manages a plurality of small cell base stations, comprising:
  receiving a reconfiguration request,
  selecting a radio access technology (RAT) of a selected one of the plurality of small cell base stations according to the reconfiguration request;
  sending a state report request to the selected small cell base station according to the reconfiguration request;
  judging the RAT of the selected small cell base station based on the state report transferred from the selected small cell base station; and
  requesting that the selected small cell base station operate using the selected RAT,
  wherein the requesting of the selected small cell base station to operate using the selected RAT is performed when the RAT of the selected small cell base station is different from the selected RAT.

9. The small cell base station managing method of claim 1, further comprising:
  reserving a schedule according to the reconfiguration request, and
  wherein the requesting the selected small cell base station to operate using the selected RAT is performed according to the reserved schedule.

10. A small cell base station managing system comprising:
  a communication unit communicating with an external device;
  a small cell base station control database storing information about radio access technology (hereinafter, referred to as RAT) of small cell base stations; and
  a processing unit controlling the communication unit and the small cell base station control database,
  wherein when a reconfiguration request is received from the communication unit, the processing unit updates the small cell base station control database according to the reconfiguration request,
  wherein the processing unit reserves a schedule according to the reconfiguration request and controls the communication unit in order to send a RAT reconfiguration request to a selected small cell base station according to the schedule that is reserved.

11. The small cell base station managing system of claim 10, wherein the processing unit updates information about RAT of a small cell base station selected from the small cell base station control database according to the reconfiguration request.

* * * * *